United States Patent [19]
Fujii et al.

[11] Patent Number: 5,253,003
[45] Date of Patent: Oct. 12, 1993

[54] FLASH-INTEGRATED CAMERA

[75] Inventors: Hidehiko Fujii; Yoshiyuki Inoue; Takahiro Iimori, all of Osaka, Japan

[73] Assignee: Minolta Camera Kabushiki Kaisha, Osaka, Japan

[21] Appl. No.: 785,151

[22] Filed: Oct. 31, 1991

Related U.S. Application Data

[63] Continuation of Ser. No. 526,836, May 22, 1990, abandoned.

[30] Foreign Application Priority Data

May 24, 1989 [JP] Japan .................. 1-131747

[51] Int. Cl.$^5$ .............................. G03B 15/03
[52] U.S. Cl. .............. 354/149.1; 354/149.11
[58] Field of Search ............ 354/149.1, 149.11, 145.1, 354/126; 352/198

[56] References Cited

U.S. PATENT DOCUMENTS

| | | | |
|---|---|---|---|
| 3,798,668 | 3/1974 | Hartmann | 354/149 |
| 4,893,140 | 1/1990 | Yamamoto et al. | 354/149.11 |
| 4,910,542 | 3/1990 | Yamamoto et al. | 354/149.11 |
| 4,970,539 | 11/1990 | Sasagaki et al. | 354/149.1 |

FOREIGN PATENT DOCUMENTS

| | | |
|---|---|---|
| 0275089 | 7/1988 | European Pat. Off. ....... 354/149.11 |
| 55-2271 | 1/1980 | Japan . |
| 58-180541 | 12/1983 | Japan . |
| 60-83921 | 5/1985 | Japan . |

OTHER PUBLICATIONS

Magazine entitled "Asahi Camera," pp. 248-258, published Dec. 1, 1988.

Primary Examiner—M. Gellner
Assistant Examiner—Howard B. Blankenship
Attorney, Agent, or Firm—Willian Brinks Olds Hofer Gilson & Lione

[57] ABSTRACT

A camera having a pentagonal prism including a flash light emitting portion above the pentagonal prism and a driving force generator for generating a driving force to move the flash light emitting portion located beside the pentagonal prism. The driving force is transmitted to the flash light emitting portion by driving force transmitting means for moving the flash light emitting portion to change flash coverage.

4 Claims, 4 Drawing Sheets

FLASH-INTEGRATED CAMERA

This application is a continuation of application Ser. No. 07/526,836, filed May 22, 1990; now abandoned.

BACKGROUND OF THE INVENTION

1. Field of the Invention

The present invention generally relates to a flash-integrated single lens reflex camera, and, more particularly, to a camera having a movable built-in flash light emitting portion.

2. Description of the Prior Art

In a single lens reflex camera, the photographic lens generally projects forwardly of the camera. If the light emitting portion of a built-in flash device is located close to the optical axis of the photographic lens, part of the light from the flash may be obstructed by the lens. In such a case, the emitted light may not reach part of the object to be photographed. For this reason, it is desirable to locate the light emitting portion away from the optical axis. As a result, built-in flash devices are conventionally placed above the pentagonal prism in the camera, relatively far from the optical axis of the lens.

On the other hand, the light emitting portion should be moved along the optical axis in order to change flash coverage as a function of lens focal length. In prior cameras, flash devices having function of changing flash coverage are typically separate from the camera body, although they may be mounted to the body for use, if necessary.

To move a built-in flash light emitting portion, it is possible to locate a driving force generator (a driving motor to move the light emitting portion and appropriate reduction gearing) near the light emitting portion above the pentagonal prism. But such a configuration makes the pentagonal part of the camera large, and causes the flash to project from the top of the camera body by a large amount, thereby impairing portability of the camera.

SUMMARY OF THE INVENTION

To solve the above problems, it is a primary object of the present invention to provide a flash device built into a camera above the camera's pentagonal prism, wherein the movable light emitting portion does not project significantly above the pentagonal prism.

To achieve the above object, a camera equipped with a pentagonal prism in the upper part of the camera comprises, according to the present invention, an upper cover housing the upper part of the camera; a flash light emitting portion disposed above the pentagonal prism; a driving force generator disposed inside the upper cover and beside said pentagonal prism for generating a driving force; and a driving force transmitting means mounted between the flash light emitting portion and the driving force generator for transmitting the driving force generated by the driving force generator to the flash light emitting portion for moving the flash light emitting portion.

According to the present invention, the driving force generated by the driving force generator, which is disposed beside the pentagonal prism, is transmitted to the flash light emitting portion, which is located above the pentagonal prism, by the driving force transmitting means to move the flash light emitting portion. Because the driving force generator is located beside the pentagonal prism, not many parts are required to be assembled above the pentagonal prism, thus permitting the upper part of the pentagonal prism to be kept small in size. Hence, with the present invention, it is possible to provide a compact flash-integrated camera having substantial portability.

Further objects, features and advantages of the present invention will appear more fully from the following detailed description of preferred embodiments of the invention.

DESCRIPTION OF THE PREFERRED EMBODIMENTS

Figure 1:
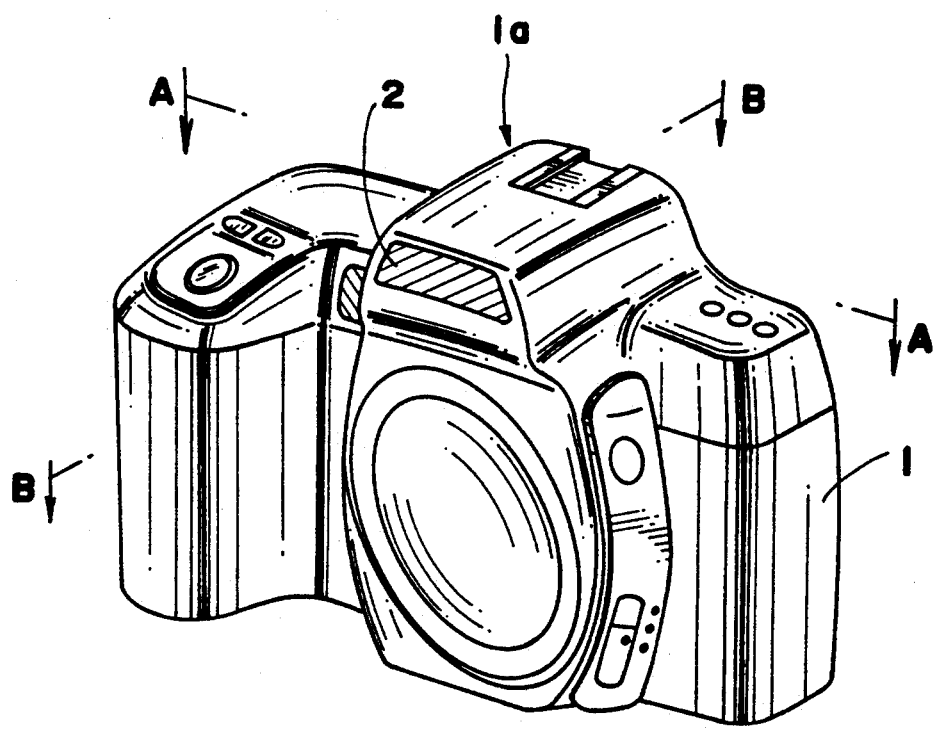
FIG. 1 illustrates a camera body according to one embodiment of the present invention.

FIG. 1 illustrates a single lens reflex camera body (with lens dismounted) according to one embodiment of the present invention.

On top of body 1, a pentagonal part 1a is formed within which a pentagonal prism is mounted. A flash device is built into this pentagonal part and is designed to illuminate an object through a flash panel 2. The flash coverage provided by the flash device can be changed as a function of focal length or zooming of a mounted lens as is explained in detail below.

Figure 2:
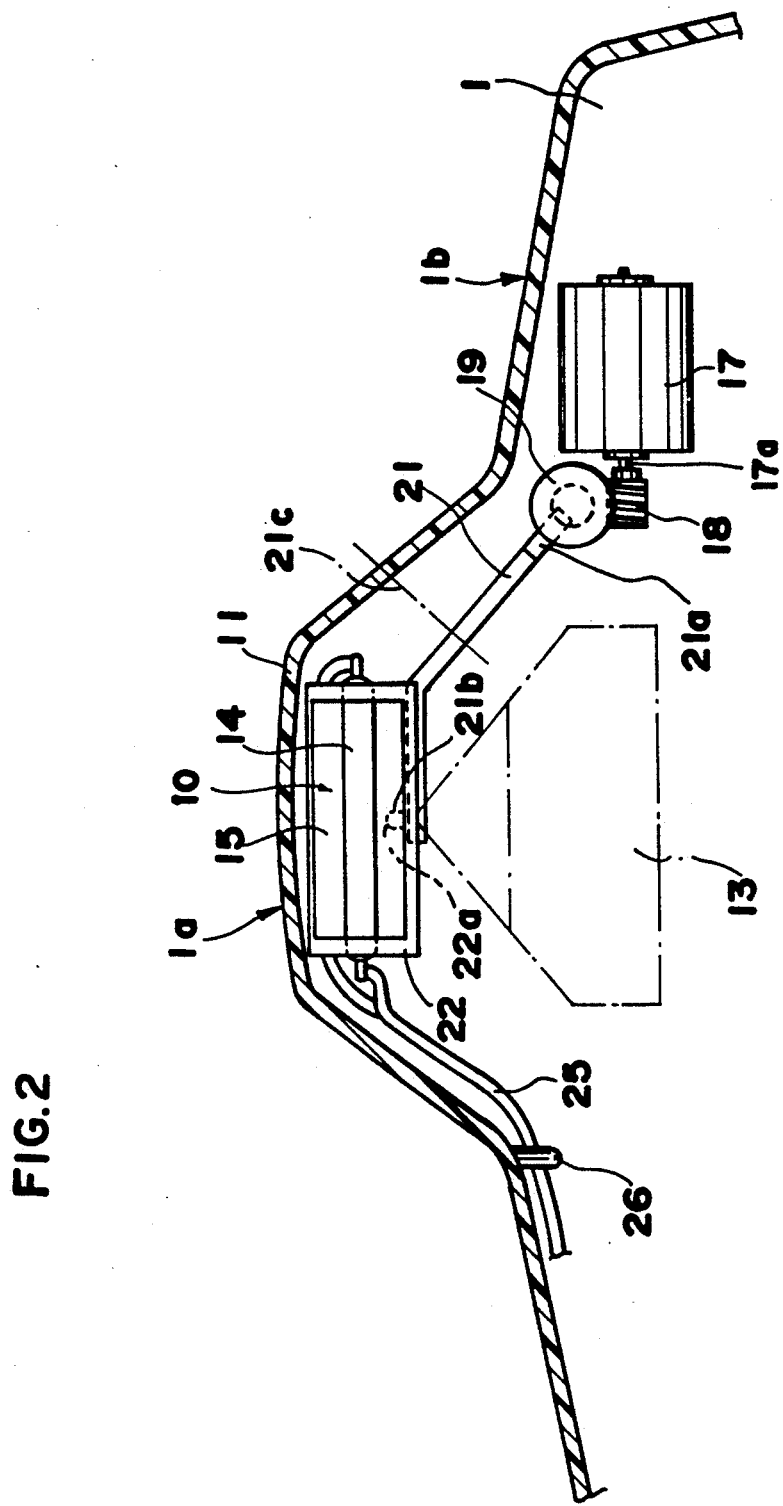
FIG. 2 is a sectional view of principal portions of the camera of FIG. 1 taken along line A—A of FIG. 1.
Figure 3:
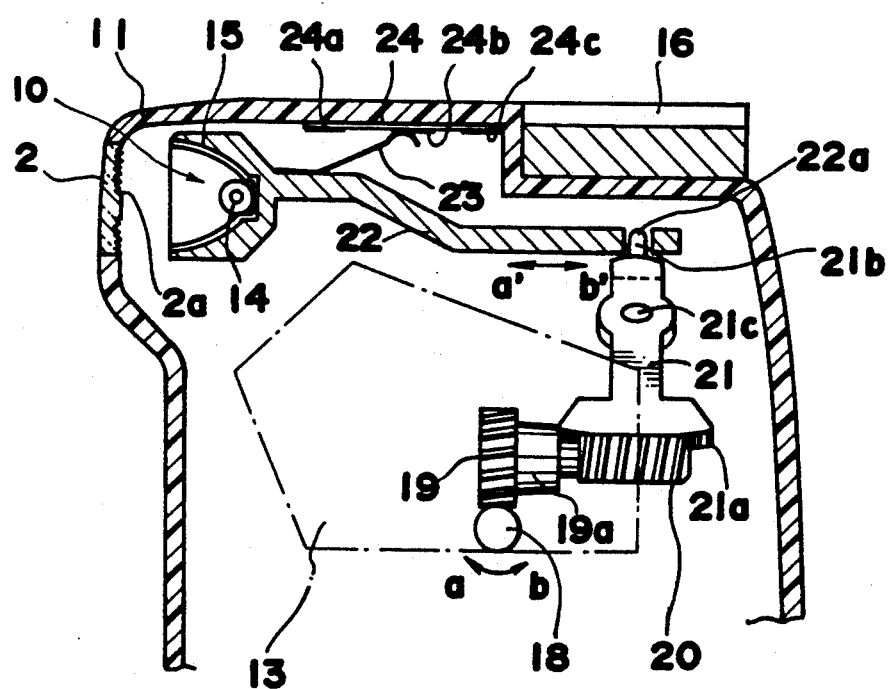
FIG. 3 is a sectional view of principal portions of the camera of FIG. 1 taken along line B—B of FIG. 1.

FIG. 2 is a sectional view taken along line A—A of FIG. 1, and FIG. 3 is a sectional view taken along line B—B of FIG. 1. For clarity, FIGS. 2 and 3 show only those portions and parts of the camera which are related to the flash device and which are necessary for a complete understanding of the present invention.

With reference first to FIG. 3, the flash device includes a light emitting portion 10 which is comprised of a reflector 15 and a xenon tube light source 14. As shown, the light emitting portion is located in front of and above the pentagonal prism 13. Flash panel 2 is disposed in front of the light emitting portion 10, and has an inside surface 2a which is composed of a Fresnel lens. Movement of the light emitting portion 10 back and forth (horizontally in FIG. 3) causes a change in the flash illuminating angle. An accessory shoe 16 is formed at the back of and above the pentagonal prism 13 for mounting a detachable flash or other accessory to the camera.

With reference to FIGS. 2 and 3, the mechanism for moving the light emitting portion will now be described.

A motor 17 is disposed adjacent to the shoulder part 1b of body 1 which extends outwardly and downwardly from the pentagonal part 1a. A worm gear 18 is attached to the rotating shaft 17a of the motor, and engages a wheel gear 19. Moreover, on the shaft 19a of the wheel gear 19 another worm gear 20 is attached. The wheel gear 19 and the worm gear 20 are friction-coupled with spring friction to prevent breakage of the gears and the motor under an overloaded condition.

An arm 21 extends along the sloping portion of upper cover 11 between the upper cover 11 and the pentagonal prism 13 and is pivotally supported for rotation about an axis 21c. On one end of arm 21 a wheel portion 21a is formed which engages the worm gear 20; and on the other end, a protrusion 21b is formed for linking the arm with a reflector holding member 22. The reflector holding member 22 is located above the pentagonal prism, and holds the aforementioned light emitting portion 10 comprised of reflector 15 and xenon tube 14. A hole 22a is formed in reflector holding member 22, for linking with the arm 21, and by receiving the protrusion 21b of arm 21 in the hole, the reflector holding member 22 and the arm 21 are coupled.

On upper cover 11 above the reflector holding member 22 and on a plate below (not shown in the FIGS.), guides for moving the reflector holding member 22 back and forth are formed, and the reflector holding member 22 moves along the guides. A slide piece 23 extends from the upper part of the reflector holding member 22 and is adapted to slide on patterns 24a, 24b and 24c formed on a board 24 mounted on the upper cover 11 during movement of the reflector holding member 22. These patterns 24a, 24b and 24c are, respectively, connected to terminals of an unillustrated microcomputer. The slide piece 23 is grounded and the terminal, corresponding to the pattern which the slide piece 23 touches, turns "low". The microcomputer judges which terminal is "low", thereby monitoring which pattern the slide piece 23 touches, and thereby identifies the position of the light emitting portion at that time.

By monitoring the position of the slide piece 23 in this way, the microcomputer drives the motor 17 which, in turn, moves the light emitting portion to the position where the desired flash coverage corresponding to the focal length of the mounted lens can be obtained. For example, when a telephoto lens having a long focal length is mounted to the camera, the light emitting portion is moved away from the flash panel 2 to the position where slide piece 23 touches pattern 24c to narrow the flash coverage. In contrast, when a wide-angle lens having a short focal length is mounted to the camera, the light emitting portion is moved closer to the flash panel 2 such that the slide piece 23 touches pattern 24a to widen the flash coverage.

The movement of light emitting portion 10 will now be described in detail.

When a standard lens (focal length: 50 mm) is mounted to the camera, the light emitting portion is located at the position where the slide piece 23 touches the pattern 24b. When the standard lens is replaced by a wide-angle lens (focal length: 35 mm), the microcomputer takes focal length data from a lens ROM in the camera, and recognizes that a wide-angle lens is mounted. At this moment, the light emitting portion should be located where the slide piece 23 touches the pattern 24a. The microcomputer therefore drives the motor 17 to move the light emitting portion to the position where the slide piece 23 touches pattern 24a. In this case, the rotation direction is "a" in FIG. 3. The rotation is reduced by the series of worm and wheel gears 19, 20, 21a, and this force drives the reflector holding member 22 in direction "a'" through the arm 21. The motor drive is stopped when the slide piece 23 touches pattern 24a and the terminal corresponding to the pattern 24a is changed to low.

If a telephoto lens (focal length: 80 mm) is mounted to the camera, the microcomputer recognizes that the mounted lens is a telephoto lens according to data from the lens ROM, and drives the motor 17 so that the light emitting portion moves to the position where the slide piece 23 touches the pattern 24c. At this time, the motor 17 is rotated in direction "b". Moreover, when a standard lens is mounted, if the slide piece 23 is located at the pattern 24a, the motor 17 is driven in direction "b", or if the slide piece 23 is located at the pattern 24c, the motor 17 is rotated in direction "a", and is stopped when the slide piece 23 touches the pattern 24b.

The camera according to this embodiment can accommodate three different lenses; telephoto, standard and wide-angle, but it is not intended to limit the number of lenses that may be used. By increasing the number of patterns on board 24, it is possible to exchange a larger number of lenses. It is also possible, with the present invention, to deal with many kinds of lenses including a zoom lens. To handle a zoom lens, however, it is necessary for the microcomputer to detect focal length continuously. Also, the slide piece 23 need not be mounted to the reflector holding member 22. It may be mounted to any member which moves with the light emitting portion, and changes position corresponding to the position of the light emitting portion, for example, the arm 21.

The means for detecting the position of the light emitting portion is also not limited to the specific structure described in this embodiment. For instance, it is possible to set the initial position of the light emitting portion and to determine its subsequent position by the direction and length of its movement form the initial position. In such a case, by mounting an encoder on the rotating shaft 17a of the motor 17, it is possible to detect the number of rotations of the motor 17 by the encoder and to calculate the moving length from the number of rotations.

As shown in FIG. 2, a lead wire 25 connected to the light emitting portion is hooked by a clip 26 formed on the upper cover 11 and stabilized at a position far from the light emitting portion.

All the aforementioned structure including the light emitting portion 10, motor 17, and members to transmit the motor drive force to the light emitting portion [wheel gear 19, worm gear 20, arm 21 and reflector holding member 22] are disposed on the upper cover 11. As a result, testing can be conducted when these parts are mounted on the upper cover 11 without attachment to the body.

As described above, the driving device to move the light emitting portion which is located above the pentagonal prism is arranged not in the pentagonal part 1a but adjacent the shoulder part 1b. Therefore, the pentagonal part need not be large in size.

Figure 4:
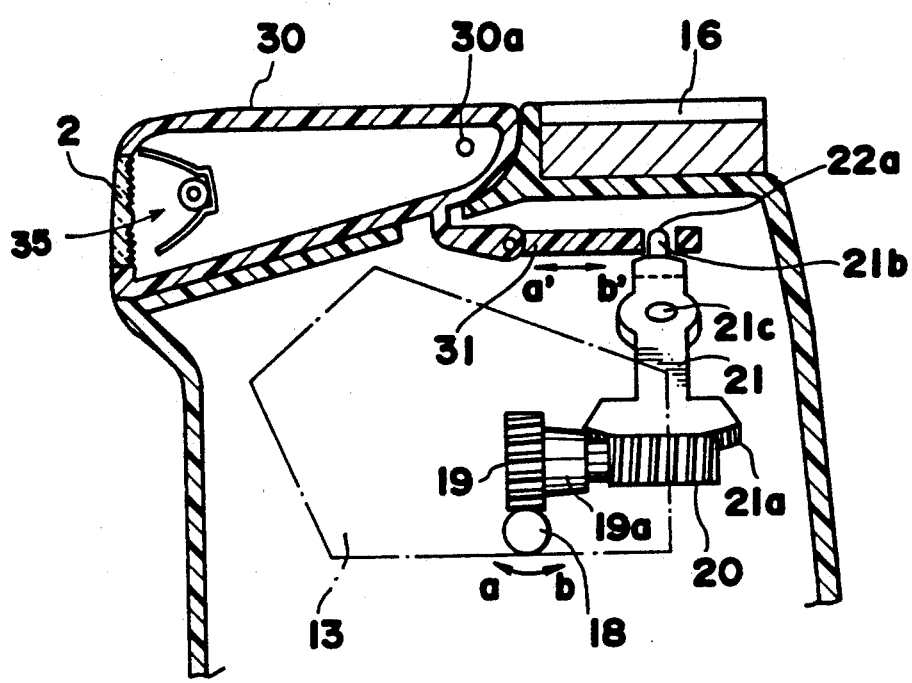
FIGS. 4 and 5 are sectional views of principal portions of a camera according to a second embodiment of the present invention.
Figure 5:
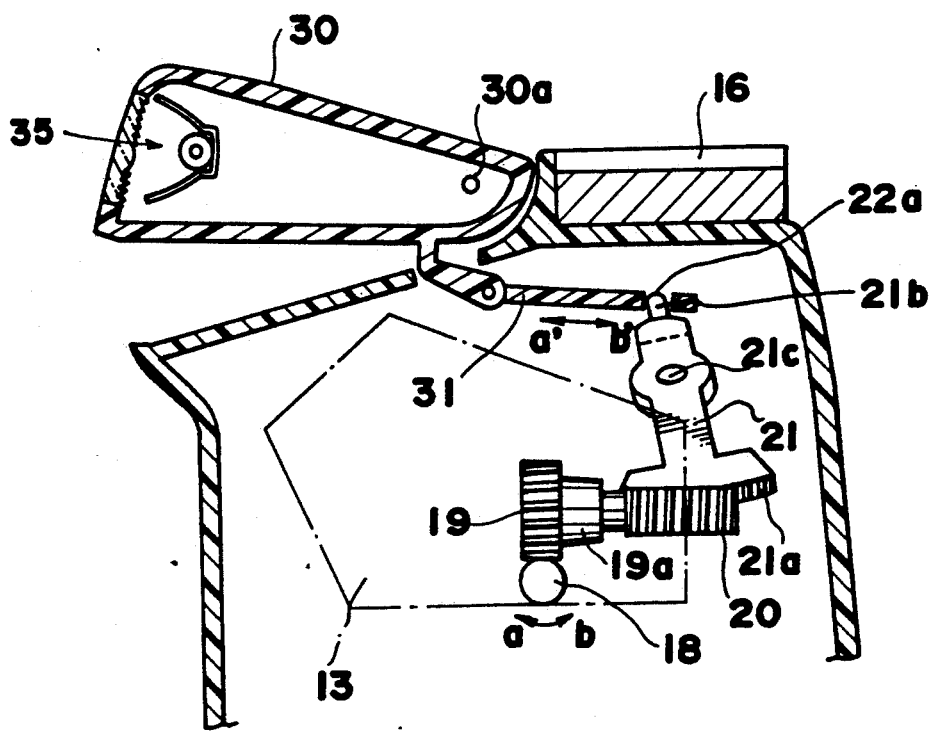

The present invention can be applied to move the light emitting portion not only for changing flash coverage, but for other reasons as well. For example, the present invention can be employed to project or retract a light emitting portion as shown in FIGS. 4 and 5. Specifically, FIGS. 4 and 5 show an embodiment in which the light emitting portion 35 is selectively located at a retracted position and at a projecting position enabling flash light emission, respectively.

In FIGS. 4 and 5, similar to the embodiment of FIGS. 1–3, a lever 31 is moved in the direction a' when the motor 17 is driven in the direction a, while the lever 31 is moved in the direction b' when the motor 17 is driven in the direction b'.

In the embodiment of FIGS. 4 and 5, the flash device 30 is pivotally supported around an axis 30a and is rotatable in response to the movement of the lever 31. Accordingly, the light emitting portion 35 is moved up to the projected position shown in FIG. 5 by movement of the lever 31 in the direction a' while moved down to the retracted position shown in FIG. 4 by movement of the lever 31 in the direction b'.

Although the invention has been described above in its preferred forms with a certain degree of particularity, it is to be understood that the present disclosure of the preferred forms may be changed in the details of construction and in the combination and arrangement of parts without departing from the spirit and the scope of the invention as hereinafter claimed.

What is claimed is:

1. A camera equipped with an image erection optical arrangement in an upper part thereof comprising:
   (a) an upper cover housing the upper part of the camera;
   (b) a flash light emitting portion disposed inside said upper cover above said image erection optical arrangement;
   (c) a light projecting portion through which the light emitted by said flash light emitting portion is projected toward an object, said light projecting portion being immovably positioned relative to and above the image erection optical arrangement and in front of said flash light emitting portion;
   (d) a driving force generator disposed inside said upper cover and positioned beside said image erection optical arrangement and below said flash light emitting portion for generating a driving force;
   (e) driving force transmitting means mounted between said flash light emitting portion and said driving force generator for transmitting the driving force generated by said driving force generator to the flash light emitting portion for moving said flash light emitting portion in a direction close to and apart from said immovably positioned light projecting portion within an area below and inside said upper cover and behind said light projecting portion and without exposing the flash light emitting portion out of the upper cover;
   (f) means for detecting the position of said flash light emitting portion including a plurality of spaced patterns each of which is located at a position corresponding to the focal length of one of a plurality of photographic lenses which are mountable to the camera; and
   (g) means movable with said flash light emitting portion for contacting said plurality of spaced patterns as a function of the position of said flash light emitting portion to identify the position of said flash light emitting portion.

2. A camera equipped with an image erection optical arrangement in an upper part thereof, the optical arrangement having an inclined top surface extending downward from the center portion to the side end portion of the optical arrangement, said camera comprising:
   (a) an upper cover housing the upper part of the camera and having a sloped portion for covering the inclined top surface of said optical arrangement;
   (b) a flash light emitting portion disposed above said optical arrangement;
   (c) a driving force generator disposed inside said upper cover and beside said optical arrangement for generating a driving force, and
   (d) driving force transmitting means mounted between said flash light emitting portion and said driving force generator for transmitting the driving force generated by said driving force generator to the flash light emitting portion for moving said flash light emitting portion, said driving force transmitting means having an arm member which is extended between and along said inclined top surface of said optical arrangement and said sloped portion of said upper cover.

3. A camera according to claim 2, wherein said driving force generator comprises a motor having a rotating shaft, and wherein said driving force transmitting means further includes reduction gearing connected between said rotating shaft and one end of said arm.

4. A camera according to claim 3, wherein said flash light emitting portion includes a light source and a reflector, and wherein said driving force transmitting means further includes a reflector holding member, the other end of said arm being connected to said reflector holding member.

* * * * *